US011823500B2

(12) United States Patent
Claude et al.

(10) Patent No.: US 11,823,500 B2
(45) Date of Patent: Nov. 21, 2023

(54) METHOD, MODULE AND APPARATUS FOR DISPENSING LOTTERY TICKETS

(71) Applicant: Sadamel SA, La Chaux-de-Fonds (CH)

(72) Inventors: Fabien Claude, La Chaux-de-Fonds (CH); Fabian Sommer, La Chaux-de-Fonds (CH)

(73) Assignee: Sadamel SA, La Chaux-de-Fonds (CH)

( * ) Notice: Subject to any disclaimer, the term of this patent is extended or adjusted under 35 U.S.C. 154(b) by 214 days.

(21) Appl. No.: 17/423,219

(22) PCT Filed: Jan. 20, 2020

(86) PCT No.: PCT/IB2020/050402
§ 371 (c)(1),
(2) Date: Jul. 15, 2021

(87) PCT Pub. No.: WO2020/152560
PCT Pub. Date: Jul. 30, 2020

(65) Prior Publication Data
US 2022/0108562 A1    Apr. 7, 2022

(30) Foreign Application Priority Data
Jan. 21, 2019  (CH) .............................. CH00066/19

(51) Int. Cl.
*G07B 3/04*    (2006.01)
*G07B 5/02*    (2006.01)
(Continued)

(52) U.S. Cl.
CPC ................. *G07B 3/04* (2013.01); *G07B 5/02* (2013.01); *G07B 5/04* (2013.01); *G07C 15/005* (2013.01);
(Continued)

(58) Field of Classification Search
CPC ....................................................... G07B 5/02
See application file for complete search history.

(56) References Cited

U.S. PATENT DOCUMENTS

| 4,140,259 A | 2/1979 | Kostka et al. | |
| 5,301,834 A * | 4/1994 | Lee | B65H 3/523 |
| | | | 221/241 |

(Continued)

FOREIGN PATENT DOCUMENTS

| EP | 3261068 A1 | 12/2017 |
| FR | 2760443 A1 | 9/1998 |

(Continued)

OTHER PUBLICATIONS

International Search Report for PCT/IB2020/050402 dated May 13, 2020, 3 pgs.

*Primary Examiner* — Gene O Crawford
*Assistant Examiner* — Ayodeji T Ojofeitimi
(74) *Attorney, Agent, or Firm* — Blank Rome LLP

(57) ABSTRACT

The invention relates to a module (100) for dispensing tickets, comprising: a chassis (1) holding a plurality of cassettes (3) each comprising a housing for housing a book of tickets and a dispensing mechanism, and a movable robot (2) configured to be selectively coupled with one of the cassettes (3).

The robot comprises: an actuator (21) for extracting a terminal portion of the book by actuating the dispensing mechanism of the cassette, and a reception device receiving this terminal portion.

The reception device and the dispensing mechanism are jointly configured to align a separation line of the terminal portion of the book with a separating device, and/or to tension said terminal portion in order to allow the ticket to be separated by the separating device.

18 Claims, 9 Drawing Sheets

(51) Int. Cl.
*G07B 5/04* (2006.01)
*G07C 15/00* (2006.01)
*G07F 11/04* (2006.01)
*G07F 11/16* (2006.01)
*G07F 17/32* (2006.01)
*G07F 17/42* (2006.01)

(52) U.S. Cl.
CPC .......... *G07F 11/045* (2013.01); *G07F 11/165* (2013.01); *G07F 17/329* (2013.01); *G07F 17/42* (2013.01)

(56) References Cited

U.S. PATENT DOCUMENTS

| | | | |
|---|---|---|---|
| 5,611,456 A * | 3/1997 | Kasper | E05B 17/04 221/242 |
| 5,927,583 A | 7/1999 | Kyle | |
| 6,095,624 A * | 8/2000 | Wilbert | G07B 3/04 312/293.3 |
| 7,383,099 B2 * | 6/2008 | Pollard | G07F 17/32 221/125 |
| 2006/0071046 A1 | 4/2006 | Roberts et al. | |
| 2007/0017978 A1 | 1/2007 | Ho | |
| 2009/0152292 A1 * | 6/2009 | Mirkovic | G07F 11/16 221/258 |
| 2011/0071666 A1 | 3/2011 | Martin et al. | |
| 2018/0186558 A1 | 7/2018 | Mejenborg et al. | |

FOREIGN PATENT DOCUMENTS

| | | |
|---|---|---|
| FR | 2860903 A1 | 4/2005 |
| WO | WO-2017/013530 A1 | 1/2017 |

* cited by examiner

METHOD, MODULE AND APPARATUS FOR DISPENSING LOTTERY TICKETS

RELATED APPLICATIONS

The present application is a national phase of PCT/IB2020/050402, filed Jan. 20, 2020, which claims the benefit of Swiss Patent Application No. CH00066/19, filed Jan. 21, 2019. The entire disclosures of which are hereby incorporated by reference.

TECHNICAL FIELD

The present invention relates to a method, a module and an apparatus for dispensing tickets, notably tickets for games of chance with a financial stake, such as instant lottery tickets.

PRIOR ART

Games of chance with a financial stake, particularly lotteries, are ancient commercial practices and commonly played in many countries of the world.

In order to satisfy the demand for such games, self-service vending machines offering a selection from among various games have been proposed in public places, particularly instant lottery tickets.

For example, document FR2860903 describes a device for delivering lottery tickets by cutting off a selected number of tickets which are packaged as a strip.

However, the size of these dispensing devices is greatly influenced by the number of games offered, which means that the operators need to make large amounts of space available in their premises in order to offer a selection of games that is judged to be satisfactory by the users.

The siting of these very large-sized dispensing devices in premises where space is limited, such as bars, restaurants, service stations and kiosks, is therefore difficult, usually impossible.

BRIEF SUMMARY OF THE INVENTION

The object of the present invention is to propose a ticket dispensing device that is more compact than the known dispensing apparatuses.

According to the invention, these objects are achieved notably by means of the module of claim 1, of the dispensing apparatus of claim 10, and the dispensing method of claim 12. The dependent claims describe particularly advantageous embodiments.

A significant reduction in the radial bulk of the device is obtained by a separation of the ticket from the book by a joint action of the receiving device of the mobile robot and of the dispensing mechanism of the coupled cassette. In particular, this joint action involves the relative positioning of the terminal portion of the book with respect to the separation device in such a way as to separate the ticket along a predetermined separation line, notably corresponding to one of the precut lines delimiting the tickets. Alternatively or in addition, this joint action involves tensioning of the strip (notably of the terminal portion of the book) during the separation of the ticket along this predetermined separation line.

In one embodiment, the mobile robot comprises a ticket holding and transporting mechanism for collecting the separated ticket and transporting it toward a dispensing device, the ticket being positioned substantially parallel to the axis of stacking of the cassettes.

This embodiment allows the dispensing of tickets of different sizes, notably of tickets of a length exceeding 20 cm, or comprised between 20 and 30 cm, such as around 25, 26, 27 or 28 cm, to be offered while at the same time limiting the bulkiness of the dispensing apparatus. This embodiment additionally makes it possible to counter the theft of tickets because the dispensing device can be equipped with a reader able to identify each individual ticket and activate and/or log each individual ticket on a central server before dispensing it and/or to identify the installed books of tickets and thus provide the traceability thereof.

In one embodiment, the cassette comprises a raiser to raise the end of the book oriented away from the dispensing mechanism of the cassette, notably drive rollers.

This embodiment allows the book to be curved or even inclined so as to allow it to unfold correctly in a reduced amount of space.

In one embodiment, the separation of a ticket is preceded by the folding of the terminal portion of the book at the site of the separation line, notably of the precut line, delimiting the ticket that is to be separated.

This embodiment allows the portion of the book corresponding to the separation line, notably to the precut line, to be weakened, and a cleaner and more accurate separation of the ticket to be achieved.

The solutions proposed have the advantage over the prior art of offering a higher number of games while at the same time limiting the bulkiness of the dispensing device. That allows the device to be sited in public places where space is limited, while at the same time satisfying potential users with a wider selection of games.

BRIEF DESCRIPTION OF THE FIGURES

Examples of implementation of the invention are indicated in the description which is illustrated by the following figures.

EXAMPLE(S) OF EMBODIMENT OF THE INVENTION

Figure 1:
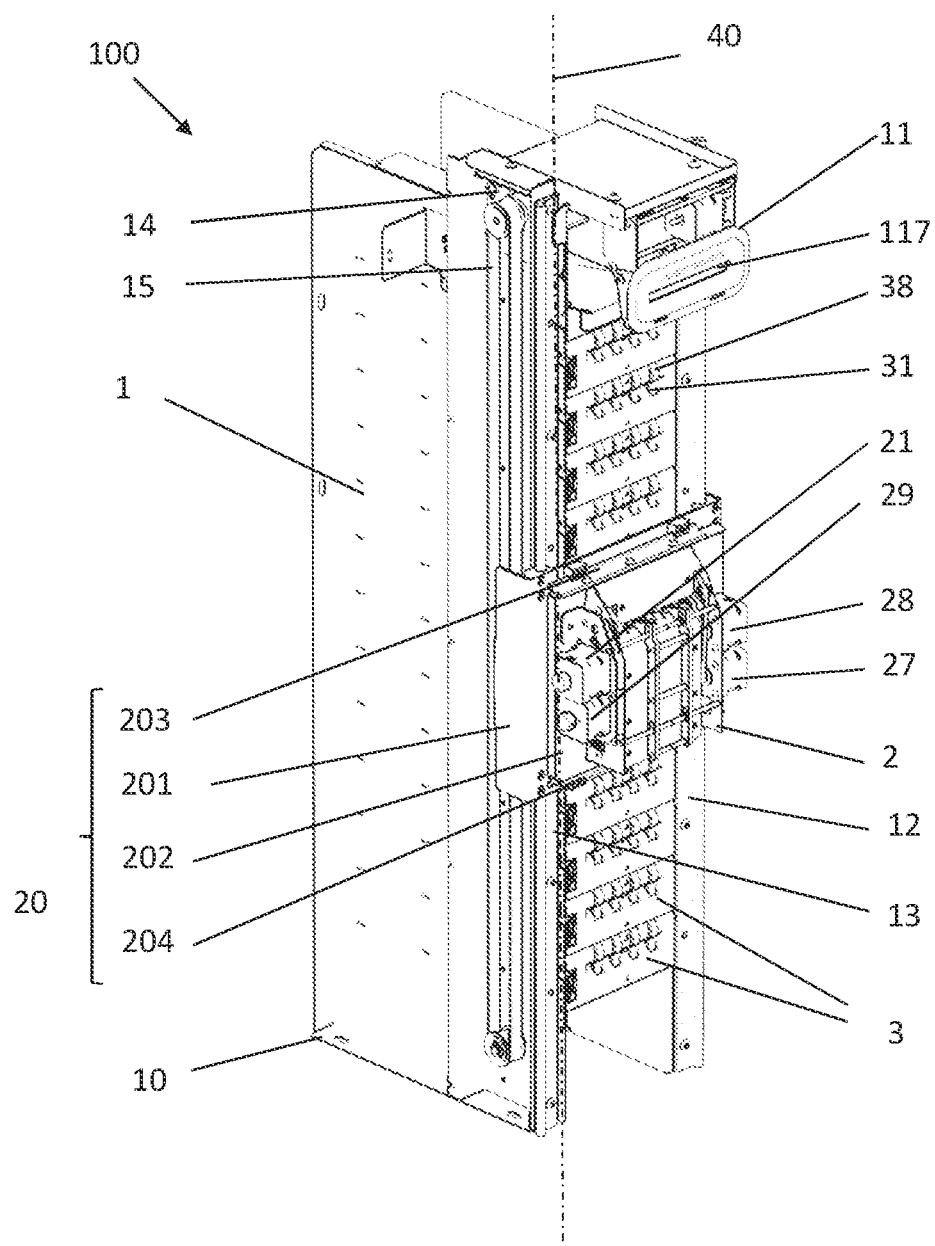
FIG. 1: module for an apparatus for dispensing preprinted tickets packaged in strips, according to the invention.

FIG. 1 illustrates an example of a module 100 for an apparatus for dispensing tickets, notably preprinted tickets packaged in books.

The module 100 comprises a chassis 1 configured to hold a plurality of removable cassettes 3, the cassettes preferably being superposed on one another along an axis of stacking 40.

Although the module 100 in FIG. 1 comprises 12 cassettes 3 so as to be able to offer up to 12 (different) formats of ticket for sale, the module 100 may be configured to hold another number of cassettes, such as 8, 10 or 16 cassettes.

Figure 2:
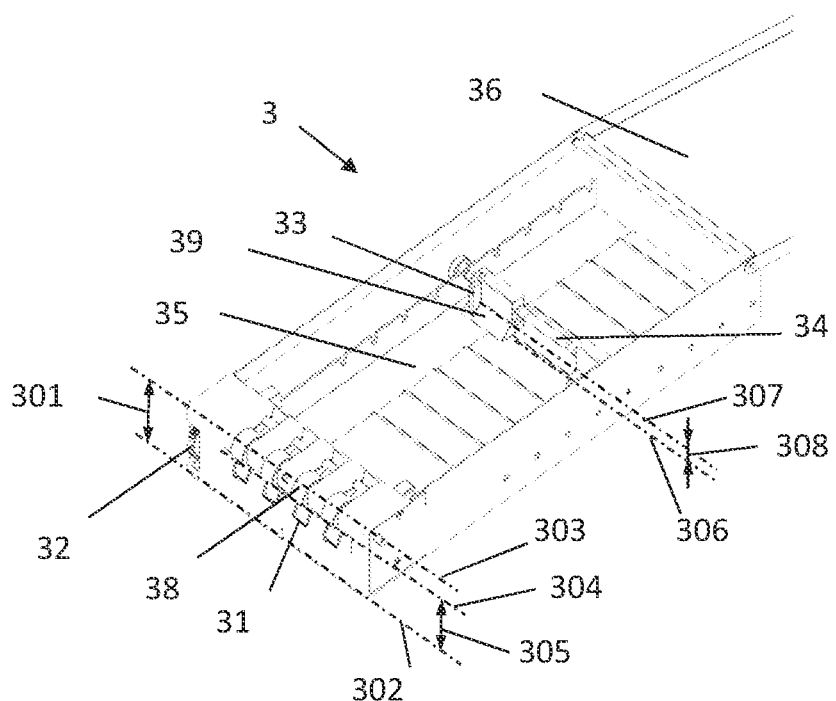
FIG. 2: detail of one of the cassettes of the module of FIG. 1.
Figure 10:
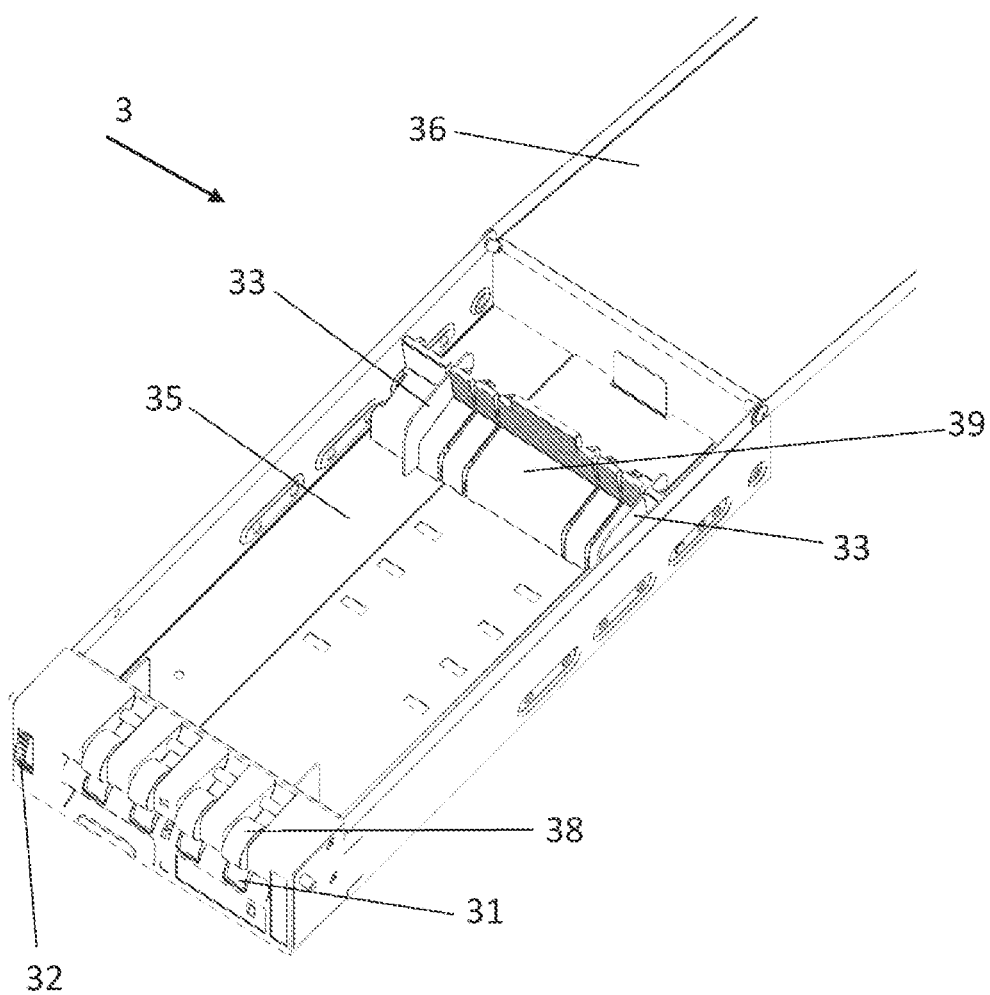
FIG. 10: detail of one of the cassettes of the module of FIG. 1, according to another embodiment.

As illustrated in FIG. 2, each cassette 3 is configured to receive and hold a book of tickets, which may be of a different format from the other books (for example relating to another instant lottery game). FIG. 10 shows a cassette 3 according to another embodiment of the present invention.

The cassette 3 comprises a housing 35 (FIG. 2, 10) to house a book 9 (FIG. 6a-6b) of tickets. What is meant by a book of tickets is a continuous strip of tickets folded into pages so that the tickets are packaged as a fan-fold (such packaging is also referred to as concertina fold or leporello fold). Each page of the book may comprise one or more tickets, which may be fully or partially preprinted.

The tickets of the book are delimited by separation lines. A separation line may be demarcated by one or more graphic or typographic signs, such as a line or a row of symbols. As a preference, alternatively or in addition, the separation line may comprise (or consist of) a precut line 910 made up of a row of through-holes and/or of stubs.

Each cassette 3 is provided with a dispensing mechanism 31, 32, 38 which, when activated, allows a terminal portion 91 of the book 9 to be extracted from the cassette. The dispensing mechanism illustrated in FIGS. 2 and 10 comprises one or more drive rollers 31, and counter-pressure rollers 38 which are configured to drive the movement of the book when it is engaged between the roller(s) and counter-pressure roller(s). The drive roller or rollers 31 are driven in rotation by a toothed drive wheel 32 which can be actuated from outside the cassette. The counter-pressure rollers are free to rotate and hold the strip of tickets (book) by pressure.

Advantageously, the cassette is configured to receive various formats of book, namely books having pages of different lengths and/or different widths.

The cassette 3 may thus be equipped with a first regulating guide 33 delimiting the width of the housing of the cassette. This guide can be moved so as to limit the movement of the book once it is housed in the cassette. According to a preferred embodiment, the cassette 3 comprises two, mutually parallel, regulating guides 33 allowing the working width of the housing of the cassette to be delimited to suit the dimensions of the book. The two guides 33 also allow the book 9 to be centered in the cassette 3 and positioned facing the dispensing mechanism 31, 32, 38.

Alternatively or in addition, the cassette 3 may be equipped with a second guide 34 delimiting the length of the housing of the cassette. This second guide 34 may be movable so as to keep the book 9 housed in the cassette as it is being extracted by the dispensing mechanism 31, 32, 38.

The cassette 3 may be equipped with a cover 36, preferably a pivoting cover, affording the book 9 protection as it is extracted from the cassette by the dispensing mechanism 31, 32, 38. In particular, the cover 36 is configured to reduce the friction with the book 9 being extracted so as to ensure the integrity of the tickets, particularly in the case of tickets with a scratch-off surface. Alternatively or in addition, the cover 36 may be configured to afford the book 9 protection against dust, moisture and/or other atmospheric agents.

Advantageously, the cassette 3 may be equipped with a raiser 39 configured to raise one side of the book of tickets, when it is housed in the housing 35, so as to curve or even incline the book so as to allow it to unfold correctly in a housing which is not as tall.

In particular, the raiser 39 is configured to raise the rear of the book 9, namely the side of the book furthest from the dispensing mechanism of the cassette, notably from the rollers 31, 38, so as to curve this side of the book 9 (or even incline the entire book, this all being dependent on the stiffness of the book), this being something that increases the angle of unfolding, namely the angle between the unfolded portion of the book and the last non-unfolded page of the book.

The raiser 39 thus makes it possible to lower the position 304 in which the book is extracted from the cassette by drive rollers 31, 38 (which is formed by the intersection of the pairs of rollers) with respect to the position of the uppermost page of the book 9 when it is housed in the cassette 3. This makes it possible for the upper edge 303 of the cassette 3 to be brought closer to the lower edge 302, thereby reducing the height 301 of the cassette 3. Reducing the height of each cassette 3 of the module 100 leads to a reduction in the resultant (vertical) bulkiness of the stack of superposed cassettes.

The raiser 39 may take the form of a raised and/or inclined surface (such as a surface of a wedge 39, of a batten or of a rod) that allows the side of the book to be held in a raised position 307 with respect to the surface 306 of the housing 35. The raise 308 (namely the distance between the surface 306 of the housing 35 and the surface 307 of the raiser) provided by the raiser 39 is typically at least 5 mm, and is preferably between 1 cm and one third, or even one half, of the height 301 of the cassette.

As illustrated in FIG. 1 and FIGS. 3-5, the module 100 comprises a mobile robot 2 able to move with respect to the chassis 1 and configured to be coupled selectively with one of the cassettes 3 of the module 100, so as to allow a ticket 92 to be separated from the book 9 of tickets that is housed in the selected cassette.

What is meant by a robot is a structure that can be moved with respect to the chassis according to a system of coordinates, preferably according to a system of Cartesian coordinates. The system of coordinates may be a one-dimensional (1D) system, notably in the case of aligned cassettes. The system of coordinates may be a 2-dimensional or 3-dimensional (2D, 3D) system, notably in the case of cassettes arranged in an array or of cassettes arranged in several rows.

Figure 5:
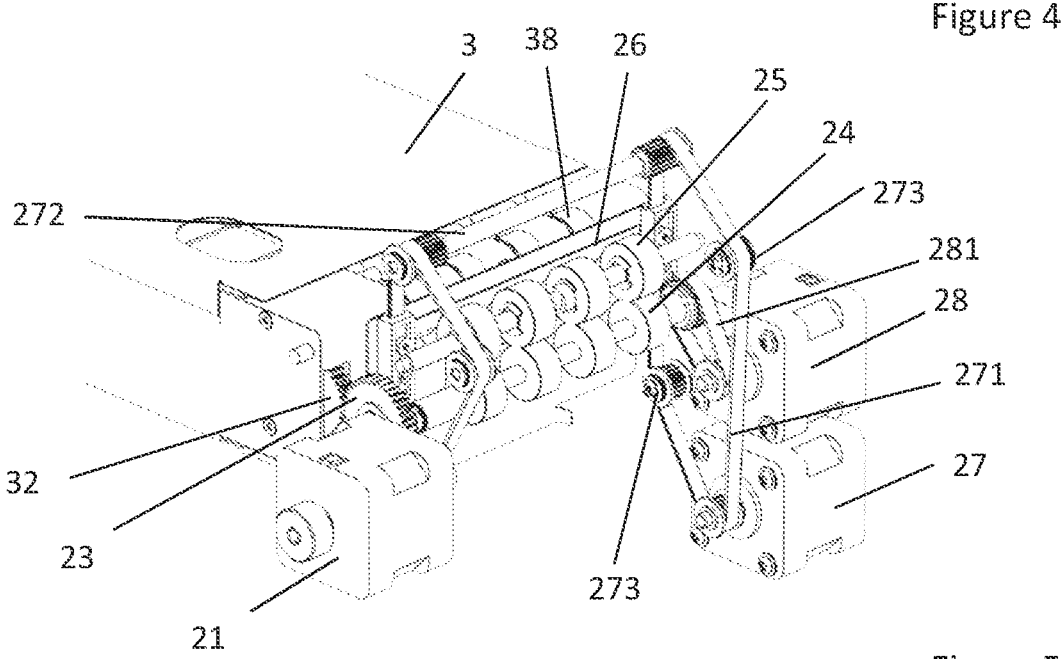
Figure 6A:
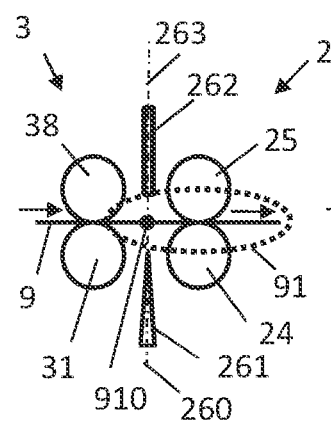
FIGS. 6a-6d: steps in the separation of a ticket packaged as a strip by the dispensing module.
Figure 6B:
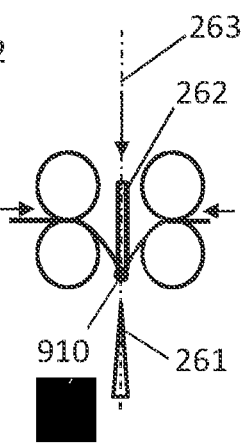
Figure 6C:
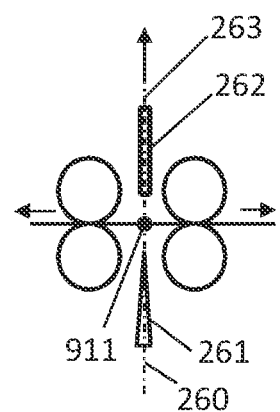
Figure 6D:
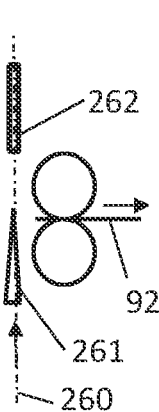

The ticket 92 is separated by a separation device 26, 261 with which the module 100 is equipped, the separation device being configured to perform separation along a separation plane 260 (cf. FIG. 6d). The module 100 may comprise a plurality of separation devices, each being solid with each cassette 3. Advantageously, the module 100 may comprise a separation device solid with the robot 2, as illustrated in FIG. 5.

The separation device may comprise one or more separating blades. The separation device may comprise one or more counterblades collaborating with the separating blade or blades.

Figure 3:
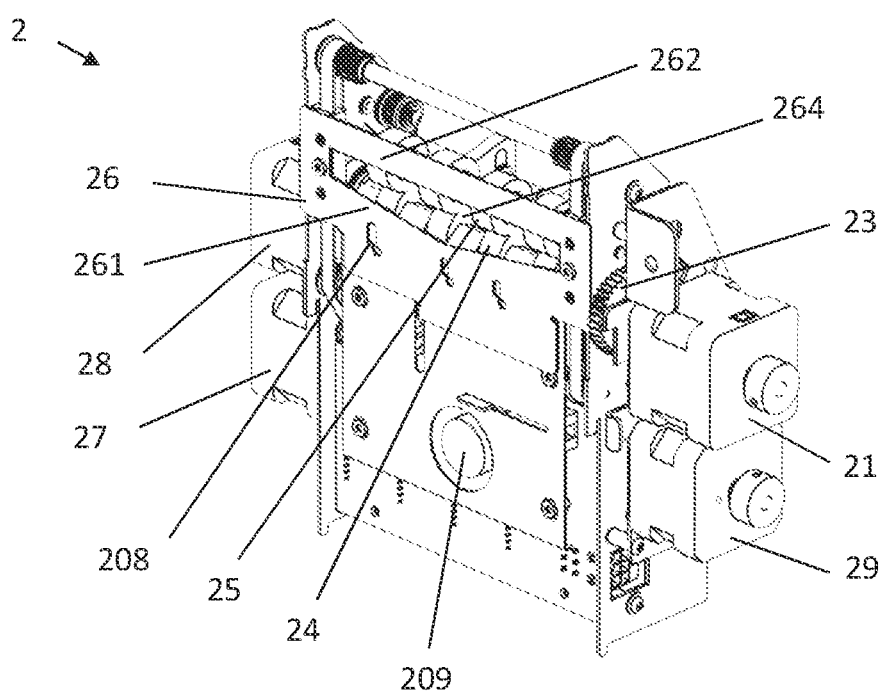
FIG. 3: robot of the module of FIG. 1.
Figure 4:
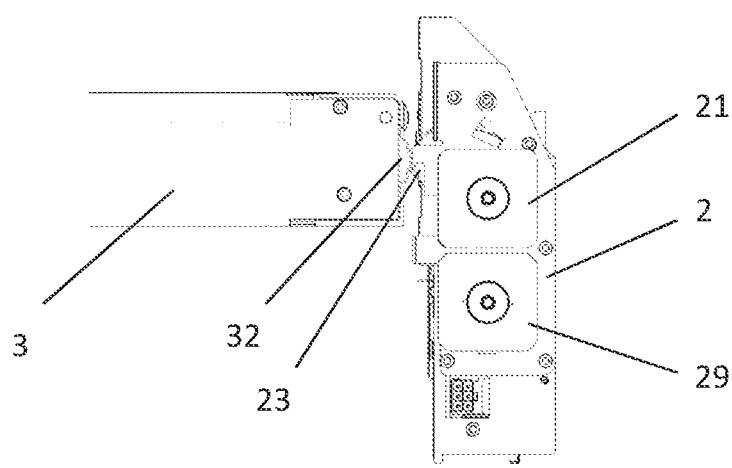
FIGS. 4 and 5: coupling between the robot and one of the cassettes of the dispensing module.

As illustrated in FIGS. 3 and 5, the separation device 26 may comprise a separating blade 261. The separating blade is able to move, relative to the robot 2, between a rest position and a cutting position, which defines the separation plane 260 of the separation device 26. The translational movement between the rest position and the cutting position is produced by an actuator 27 (such as an electric motor, an electric ram, a hydraulic or pneumatic actuator) with which the robot 2 is equipped. In the embodiment of FIGS. 3 and 5, the separating blade is actuated by a belt 271. The belt 271 is secured to the separating blade 261 and controlled by a combination of the shafts 272 and/or rotary shafts 273, 274, the belt being set in rotation by the electric motor 27 acting as an actuator and with which the robot 2 is equipped.

The movement of the robot 2 may be brought about by means of a first platform 201 capable of translational movement parallel to the axis of stacking 40 of the cassettes 3. The translational movement of the platform 201 may be brought about by means of an actuator 14, such as an electric motor, an electric ram, a hydraulic or pneumatic actuator. In the embodiment illustrated, an electric motor 14 (acting as an actuator, notably a stepping motor) acts on a belt 15 secured either to the platform 201 or to the chassis 1, the movement being guided by a pair of parallel guideways 12, 13 secured to the chassis 1.

The movement of the robot 2 may be completed by means of a second platform 202 mounted with the ability to effect a translational movement on the first platform 201 in a direction perpendicular to the direction of translational movement of the first platform 201. The relative movement of this second platform 202 with respect to the first platform 201 may be brought about by means of an actuator 29 with which the robot 2 is equipped and of a pair of guideways 203, 204.

The robot 2 comprises an actuator 21 which, when the robot 2 is coupled to one of the cassettes 3, allows actuation of the dispensing mechanism of the cassette so as to extract a terminal portion 91 of the book 9 from the cassette 3. The actuator 21 may be an electric motor, an electric ram, a hydraulic or pneumatic actuator.

In particular, as illustrated in FIG. 3, the actuator 21 may be an electric motor, notably a stepping motor. In particular, this actuator 21 may be configured to drive the rotation of the toothed drive wheel 32 of the cassette 3. The toothed drive wheel 32 may be driven in rotation by means of a toothed wheel 23 of the robot 2, this toothed wheel 23 being configured to drive the rotation of the toothed wheel 32 of the dispensing mechanism when the robot 2 is coupled with the cassette 3. The coupling of the toothed wheel 23 of the robot with the toothed drive wheel 32 of the selected cassette may be brought about by movements of the first 201 and/or the second 202 platform of the robot.

In particular, the coupling of the wheels may be achieved by:
positioning the toothed wheel 23 of the robot close to the toothed wheel 32 of the dispensing mechanism, notably by means of a translational movement of the toothed wheel 23 of the robot being perpendicular or inclined to the axis of rotation of the toothed wheel 32 of the dispensing mechanism;
aligning the toothed wheel 23 of the robot with the toothed wheel 32 of the dispensing mechanism, notably through a translational movement of the toothed wheel 23 being parallel or inclined to the axis of rotation of the toothed wheel 32 of the dispensing mechanism;
coupling the toothed wheels, through a relative translational movement of the toothed wheel 32 of the robot perpendicular to the axis of rotation of the toothed wheel 32 of the dispensing mechanism.

In the embodiment, the coupling of the wheels may be achieved by:
positioning the toothed wheel 23 of the robot vertically above or above the toothed wheel 32 of the dispensing mechanism, through a translational movement of the first mobile platform 201 of the robot;
aligning the toothed wheel 23 of the robot with the toothed wheel 32 of the dispensing mechanism, through a translational movement of the second mobile platform 202 of the robot;
coupling the toothed wheels, through a translational movement of the first mobile platform 201 of the robot.

The coupling with the desired cassette 3 may be supported by the reading of a graphic and/or electronic and/or radio (RFID) label positioned on the cassette 3 and readable by the robot 2, notably by a label reader and/or detector, such as an optical reader 208 and/or an RFID reader 209 (cf. FIG. 3).

The robot 2 further comprises a receiving device 24, 25, 28 configured to receive the terminal portion 91 of the book 9 which portion is extracted from the cassette 3 by actuating the dispensing mechanism thereof, when the robot is coupled to the cassette.

The receiving mechanism of the embodiment illustrated comprises one or more rollers 24 and counter-pressure rollers 25 which are configured to drive the movement of the terminal portion of the book 9 when this portion is extracted from the coupled cassette. The roller or rollers 24 are driven in rotation by an actuator 28 of the robot acting on a belt rotationally coupled to the shaft shafts of the roller 24.

As schematically illustrated in FIGS. 6a-6d, when the robot is coupled to one of the cassettes 3 of the module 100, the receiving device 24, 25 of the robot and the dispensing mechanism 31, 38 of the cassette are jointly configured to:
position the terminal portion 91 of the book 9 with respect to the separation device 26, notably to separate and/or fold the ticket 92 along a predetermined line 910; and/or
tension the terminal portion 91 of the book 91, notably to allow the ticket 92 to be separated by the separation device 26.

Advantageously, the module 100 may further comprise a folding device, configured to perform folding along a folding plane 263.

As illustrated in FIG. 3, the folding device may comprise a folding blade 262. The folding blade 262 is able to move, with respect to the robot 2, between a rest position and a folding position, which defines the folding plane 263 of the folding device. The folding blade 262 may be actuated by an actuator of the robot 2. In the example illustrated, the separation device 26 and the folding device are solid with one another, and actuated by the same actuator 27 with which the robot 2 is equipped.

When the robot is coupled to one of the cassettes 3 of the module 100, the receiving device 24, 25 of the robot and the dispensing mechanism 31,38 of the cassette may be jointly configured to collaborate with the folding device 262 so as to fold the terminal portion 91 of the book 9 at the site of the separation line, notably the precut line delimiting the ticket that is to be separated. This folding weakens the terminal portion 91 along the intended separation line (notably stubs in the case of precut tickets), so as not only to facilitate separation along this line but also to produce a separation with clean edges.

In particular, as illustrated in FIGS. 6a-6d, when the robot 2 is coupled to one of the cassettes 3 of the module 100, the receiving device 24, 25 of the robot and the dispensing mechanism 31, 38 of the cassette may be jointly configured to
align one of the precut lines 910 of the terminal portion 91 of the book 9 with the folding plane 263 of the folding device, notably of the folding blade 262 (cf. FIG. 6a); and/or accompany the folding of the terminal portion 91 of the book 9 along the precut line 910 by the folding device, notably by the folding blade 262 (cf. FIG. 6*b*); and/or align one of the precut lines 910 and/or the fold line 911 of the terminal portion 91 of the book 9 with the separation plane 260 of the separation device 26, notably of the separation blade 261 (cf. FIG. 6*c*); and/or tension said terminal portion 91 to allow the ticket 92 to be separated along the precut line 910 and/or along the fold line 911 by the separation device 26, notably by the separation blade 261 (cf. FIG. 6*d*).

As illustrated in FIG. 3, the folding and the separation are performed by the one same separation and folding device 26, that device comprising the separation device 26 (notably the separating blade 261) and the folding device (notably the folding blade 262) so that the separation plane 260 and the folding plane 263 are parallel, or even coplanar. In particular, this device 26 comprises an opening 264 through which the terminal portion 91 of the book passes, this opening being delimited on one side by the separating blade 261, notably in the shape of a V, and on the other side by the folding blade 262.

Folding may thus be performed by moving the separation and folding device 26 in a first direction so as to cause the folding blade 262 to come into contact with the terminal portion of the book (cf. FIGS. 6*a* and 6*b*). The separation of the ticket may be performed by moving the separation and folding device 26 in a second direction, which is the opposite direction to the first, so as to cause the separating blade 261 to come into contact with the terminal portion of the book (cf. FIGS. 6*c* and 6*d*).

The tension jointly exerted by the receiving device 24, 25 of the robot and the dispensing mechanism 31, 38 of the cassette to separate the ticket is notably greater than 20 N, or even 30 N, preferably between 30 and 50 N.

The accompanying of the folding is performed through a joint operation of the receiving device 24, 25 of the robot and of the dispensing mechanism 31, 38 of the cassette, notably by moving the ends of the terminal portion of the book closer together so as to allow the folding initiated by the folding device. As a preference, the receiving device 24, 25 of the robot and the dispensing mechanism 31, 38 of the cassette accompany the movement of the terminal portion of the book without effort, notably allowing free rotation of the drive rollers 24, 31 of the receiving device and of the dispensing mechanism.

As illustrated in FIGS. 7 to 9 and 11 to 12, the module 100 further comprises a ticket holding and transporting mechanism 22 and a ticket dispensing device 11 configured to receive the ticket from the holding and transporting mechanism 22 so as to dispense it to a user.

The ticket holding and transporting mechanism 22 is secured to the robot 2 and configured to collect the ticket separated from the book 9 and transport it to the dispensing device 11.

In particular, the ticket holding and transporting mechanism 22 may be configured, independently of or in collaboration with the receiving device of the robot, so as to collect the separated ticket with a view to transporting it to the dispensing device.

The ticket holding and transporting mechanism 22 may be configured to collect the ticket from the receiving device of the robot, notably as it exits the pairs of rollers 24, 25, and to move it into a receptacle or passage running substantially parallel to the axis of stacking 40, which orients the cut ticket in a direction substantially parallel to the axis of stacking 40. What is meant by a receptacle or passage is notably a structure or a location capable of receiving and/or holding (at least part of) the ticket.

Figure 7:
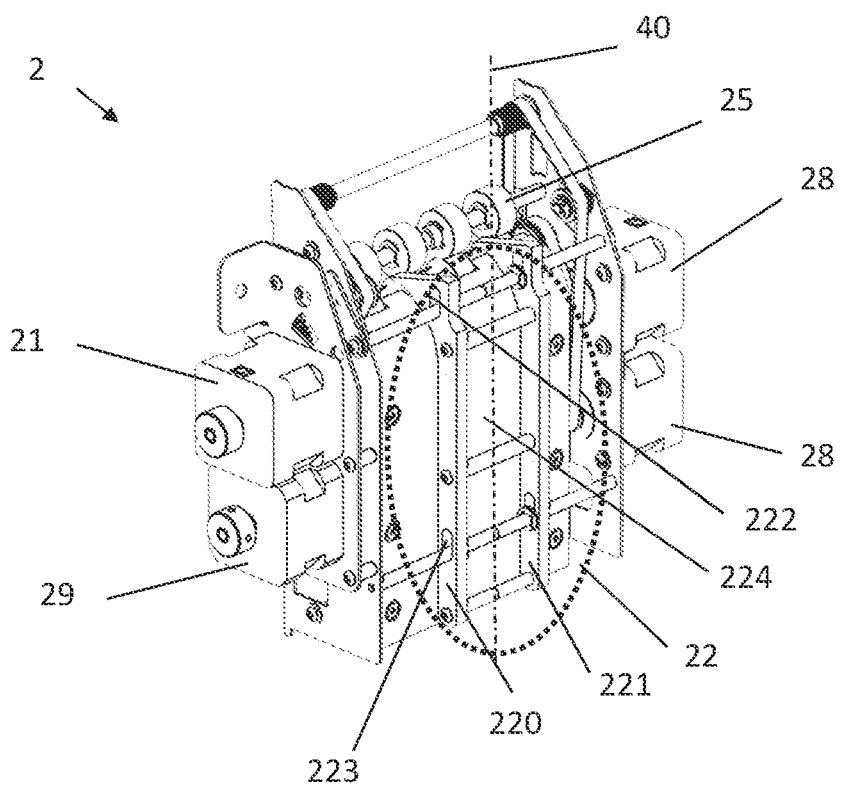
FIG. 7: ticket holding and transporting mechanism with which the mobile robot is equipped.

Alternatively, as illustrated in FIG. 7, the ticket holding and transporting mechanism 22 may be configured to collaborate with the receiving device of the robot so as to move one end of the ticket into the receptacle or passage while the other end is held by the drive rollers and the counter-pressure rollers of the receiving device of the robot.

Figure 11:
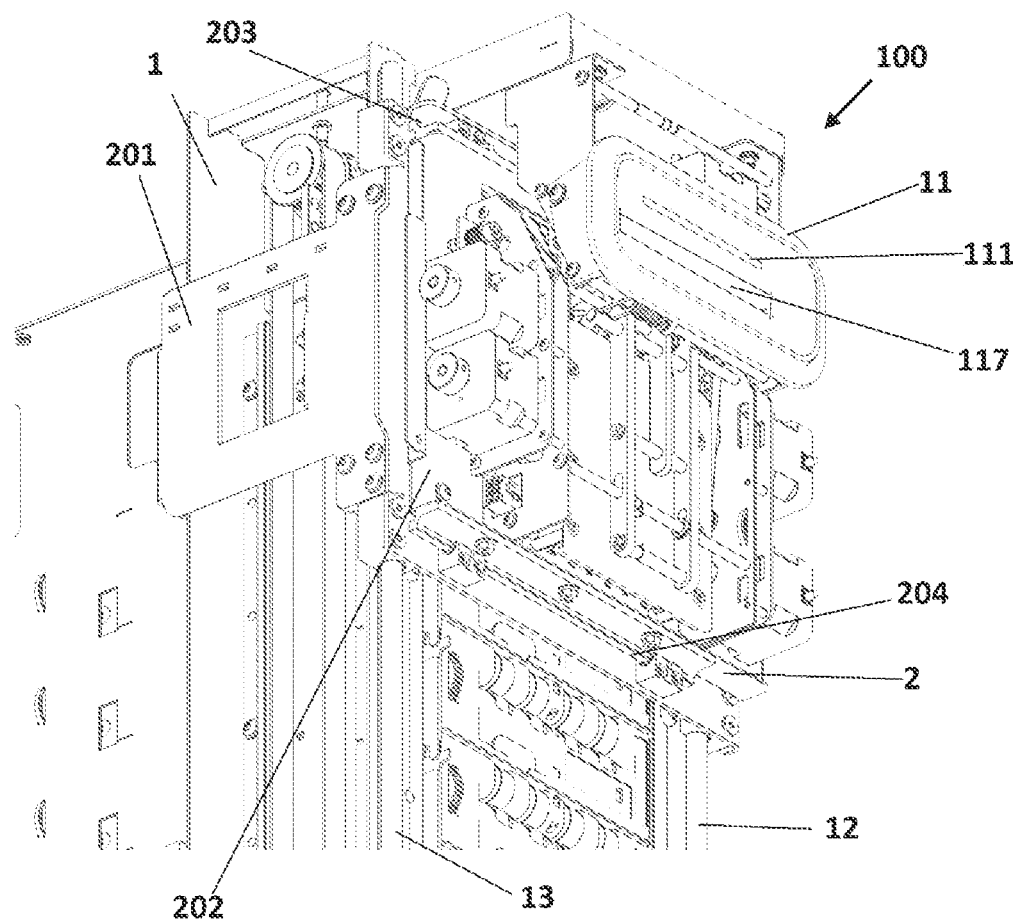
FIGS. 11 and 12: details of the ticket dispensing device of the module according to another embodiment.
Figure 12:
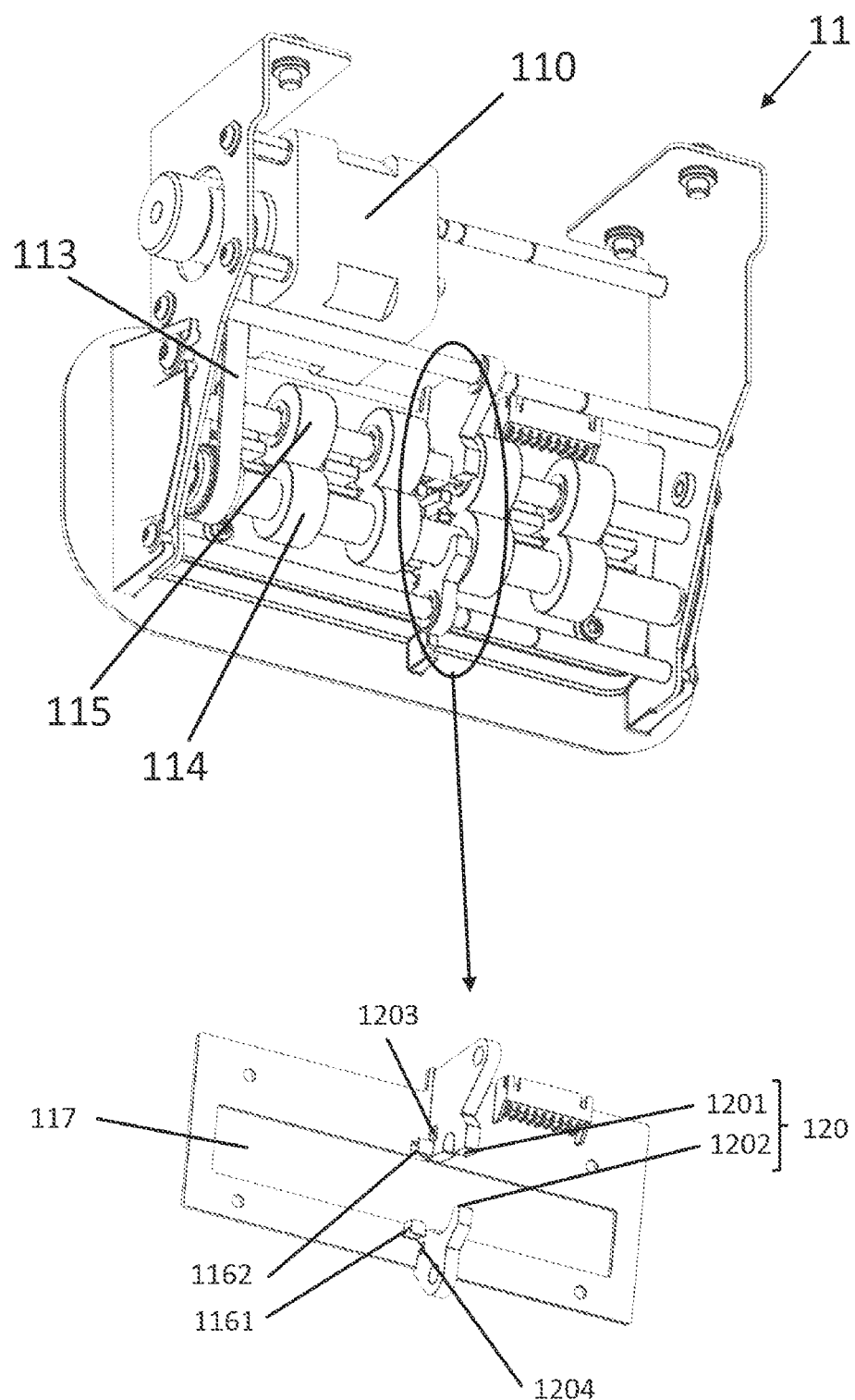

The receptacle or passage may comprise a combination of guides 220, 221 guiding the ticket, or at least one of the ends thereof, in the receptacle or passage. The guides may be mobile with respect to the robot 2, able to move between a ticket holding and transporting position and a ticket dispensing position, these notably being actuated by an actuator and guided by oblong holes 222, 223. In particular, the holding and transporting position facilitates the separating of the ticket from its book and the routing thereof toward the dispensing opening 11. The dispensing position directs the ticket into the dispensing opening 11. More than two guides may be considered, notably in order to allow the receptacle or passage to guide wider or narrower tickets. The receptacle or passage may in this instance comprise three guides, or four (FIG. 11).

The receptacle or passage may be delimited by a cap 224 of the robot 2.

The ticket holding and transporting mechanism 22 is then configured to transport, notably in translational movement along the axis of stacking 40, the ticket oriented in this way as far as the coupling of the robot 2 with the dispensing device 11. Once the robot 2 and the dispensing device 11 are coupled, the ticket holding and transporting mechanism 22 is configured to extract the ticket from the receptacle or passage and transmit it to the dispensing device 11.

Figure 8:
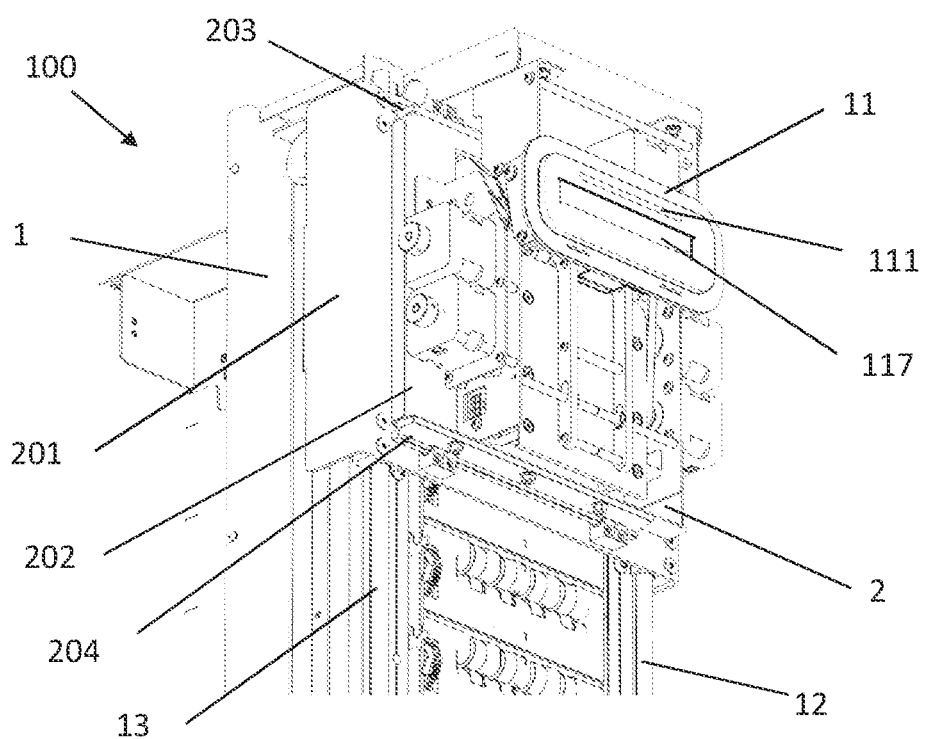
FIGS. 8 and 9: details of the ticket dispensing device of the module.
Figure 9:
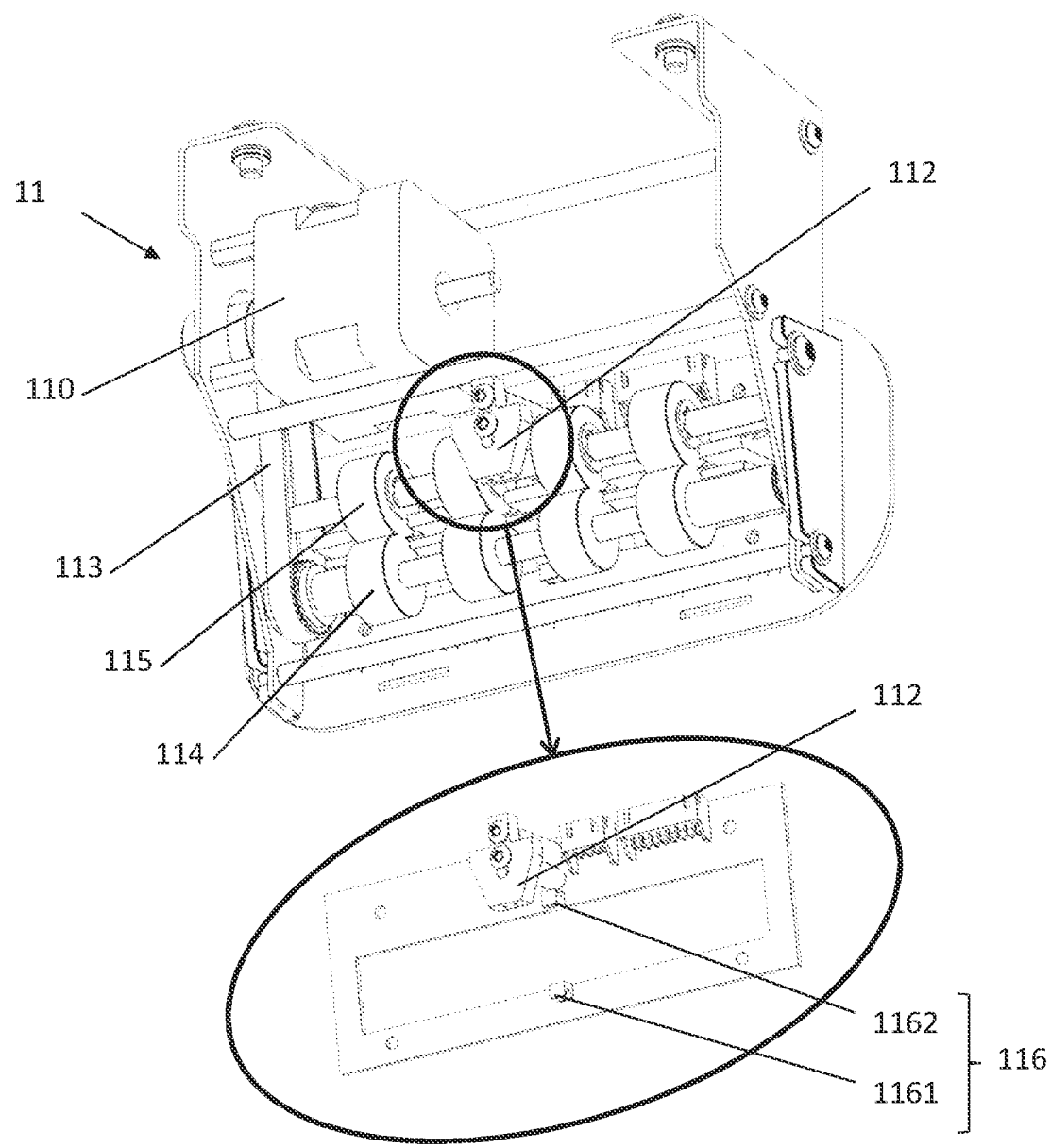

As illustrated in FIGS. 8 and 9, the dispensing device 11 is configured to deliver the ticket to a user, notably via a dispensing outlet 117.

As a preference, the dispensing device 11 is static with respect to the chassis 1.

Advantageously, the dispensing device 11 comprises one or more sensors to track the tickets being dispensed.

In particular, the dispensing device 11 may comprise one or more ticket-presence sensors 112, 116 able to verify the dispensing (the passing) of a ticket through the dispensing device 11, notably through the dispensing outlet 117 and/or a removal of the ticket by a user. The ticket-presence sensor may be an optical sensor 112 or an optical barrier comprising an emitter 1161 and a receiver 1162, or a combination of both (FIG. 9). The optical sensor 112, of the reflective type, may be replaced by an optical barrier 120 comprising an emission surface 1201 and a receiving surface 1202 positioned facing one another on either side of the dispensing outlet 117 (FIG. 12), acting as an optical guide. The emission surface 1201 may emit light or transmit the light emitted by an emitter 1203. The receiving surface 1202 may detect the light transmitted by the emission surface 1201 or else transmit it to a receiver 1204. Other optical devices may be used for detecting the passing of a ticket. In instance in which the dispensing device 11 comprises several sensors sensing the passing of a ticket, these are offset so as to determine the direction in which the ticket passes. This arrangement makes it possible to confirm that the ticket has indeed been removed by the user from the inside of the device to the outside. Combining several detectors also allows identification of the potential insertion, into the dispensing outlet 117, of an object such as a banknote or some other object that does not correspond to the normal use of the device. An alert may be generated for the intention of the user and/or emitted to a remote receiver for maintenance purposes.

Alternatively or in addition, the dispensing device 11 may comprise a ticket reader (not illustrated) configured to detect a label on the ticket 92, such as a barcode, a graphic symbol, and/or an RFID label, when the ticket is in a dispensing position.

Figure 13:
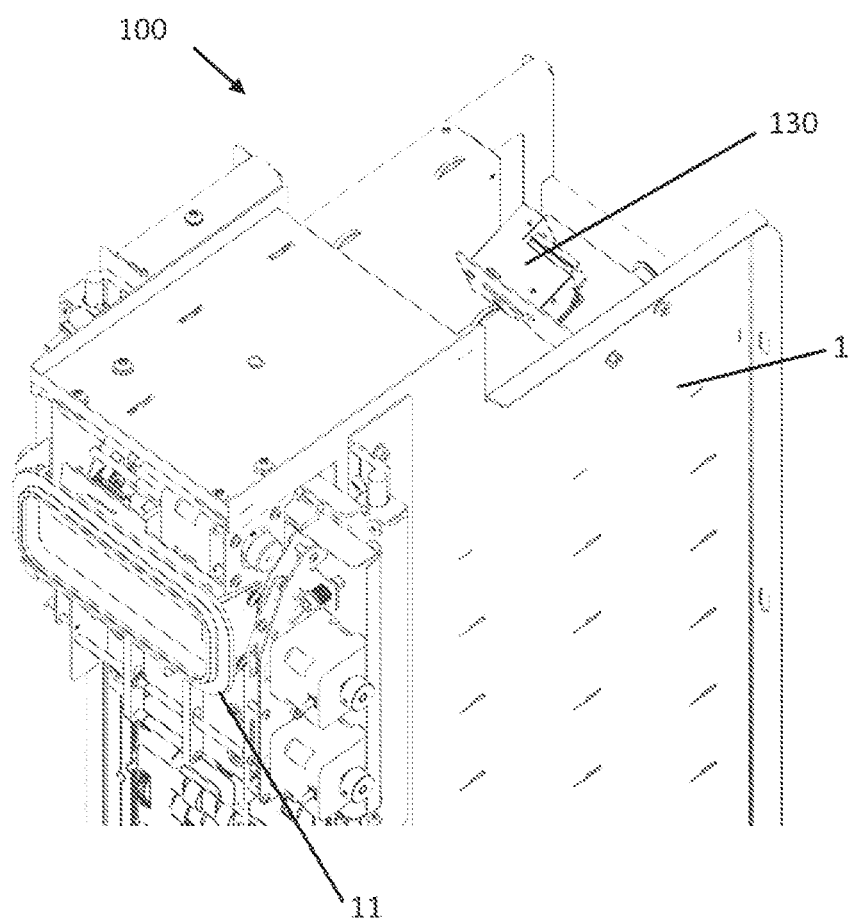
FIG. 13: module according to another embodiment of the invention.

Optionally, the module 100 comprises a barcode reader 130 arranged in such a way as to read the ticket as it is transferred from the cassette 3 to the dispensing device 11 (FIG. 13). In addition to detecting the passing of the ticket, the barcode reader 130 is able to identify the ticket before it is dispensed into the dispensing outlet 117. The barcode reader 130 is preferably fixed to or incorporated into the chassis 1 of the module 100. The barcode reader 130 may be positioned in such a way as to read the barcode of the ticket directly as it passes towards the dispensing device 117, or else via one or more mirrors (not depicted).

Advantageously, the module 100 further comprises a communication system for transmitting data supplied by the sensors of the dispensing device 11, notably from the ticket-presence sensor/sensors (112, 116, 120) and/or the ticket barcode reader (130) to a remote server, notably so as to allow tickets to be counted and/or activated and/or logged as they are dispensed.

The dispensing device 11 may comprise a printing device for printing one or more graphic and/or typographic signs on the ticket as it is being dispensed, notably in the case of tickets that are partially preprinted.

The module 100 illustrated in FIGS. 1 to 13 may be incorporated into an apparatus, notably into an apparatus of which the appearance and/or functionalities are customized by an operator and/or a supplier of tickets.

The chassis may thus be configured to allow the apparatus to be fixed to a retaining surface extending substantially vertically, such as a surface of a partition or of a wall of a structure or of a building. What is meant by substantially vertically is a direction parallel to the direction of gravity with a tolerance of +/−10°. As a preference, the chassis may be configured so that, when the apparatus is fixed to a vertical wall, the axis of stacking 40 of the cassettes results parallel to the vertical surface (with a tolerance less than +/−10°, preferably less than +/−5°).

Alternatively or in addition, the apparatus may comprise a base 10 secured to the chassis 1, the base allowing the apparatus to be sited above a bearing surface extending substantially horizontally, such as the ground or the flooring of a structure or of a building. What is meant by substantially horizontally is a direction perpendicular to the direction of gravity with a tolerance of +/−10°. As a preference, the base may be configured so that, when the apparatus is placed on top of a bearing surface, the axis of stacking 40 of the cassettes results perpendicular to the vertical surface (with a tolerance less than +/−5°).

The apparatus may be a vending machine, notably a self-service vending machine, comprising a power supply device to electrically power the module 100, and a user interface allowing one or more tickets to be selected and/or paid for.

Alternatively, the apparatus may be connected to and/or powered by a control device (such as a cash register, or a pay point) so as to allow that device to control the dispensing of tickets. Alternatively or in addition, the communication system of the module may be configured to transmit the data supplied by the sensors of the dispensing device to this control device.

REFERENCE NUMERALS USED IN THE FIGURES

100 Dispensing module
1 Chassis
10 Base
11 Dispensing device
110 Dispensing actuator
111 Visual dispensing indicator
112 Ticket-presence sensor
113 Belt
114 (Lower) dispensing roller
115 (Upper) dispensing roller
116 Ticket-presence sensor
1161 Emitter
1162 Receiver
117 Dispensing outlet
120 Optical barrier
1201 Emission surface
1202 Receiving surface
1203 Emitter
1204 Receiver
130 Barcode reader
12 Guideway
13 Guideway
14 Actuator
15 Belt
2 Robot
20 Mobile support
201 Mobile platform
202 Mobile platform
203 Guideway
204 Guideway
208 Optical reader
209 RFID reader
21 Folding and/or separation actuator
22 Ticket retaining and transporting mechanism
220,221 Guide
222-223 Oblong hole
224 Cap
23 Toothed wheel
24 Ticket drive roller
25 Counter-pressure roller
26 Separation and folding device
260 Cutting plane
261 Separating blade
262 Folding blade
263 Folding plane
264 Opening
27 Actuator
271 Belt
272 Rod
273 Shaft
28 Additional ticket drive actuator
281 Belt
29 Movement actuator
3 Cassette
301 Height
302 Lower edge
303 Upperedge
304 Book extraction position
305 Height
306 Base
307 Position of raising surface
308 Raise
31 Drive roller
32 Toothed drive wheel 33 Ticket book width regulating guide
34 Ticket book length regulating guide
35 Housing
36 Cover
38 Counter-pressure roller
39 Raiser
40 Axis of stacking
9 Book of tickets
91 Terminal portion
910 Precut line
911 Fold line
92 Ticket

The invention claimed is:

1. A module for dispensing tickets from a book of tickets, the device comprising:
a chassis configured to hold a plurality of cassettes, each cassette comprising a housing to house a book of tickets, the cassettes of said plurality of cassettes being superposed on one another along an axis of stacking,
a mobile robot able to move with respect to said chassis and configured to be coupled selectively with one of said plurality of cassettes; the robot comprising:
an actuator configured, when the robot is coupled to one of the cassettes, to actuate a dispensing mechanism of the cassette so as to extract a terminal portion of the book from the coupled cassette; and
a receiving device configured to receive said terminal portion of the book; and
a separation device configured to perform separation along a separation plane;
wherein the receiving device and the dispensing mechanism are jointly configured to:
align a separation line of the terminal portion of the book with the separation plane of the separation device; and/or
tension said terminal portion so as to allow the ticket to be separated by the separation device.

2. The module as claimed in claim 1, the book of tickets comprising precut tickets.

3. The module as claimed in claim 1, further comprising a folding device configured to perform folding along a folding plane; said folding device, said receiving device and said dispensing mechanism being configured to fold said terminal portion to correspond with said separation line.

4. The module as claimed in claim 3, said separation device comprising a separating blade able to move between a rest position and a cutting position; and/or said folding device comprising a folding blade able to move between a rest position and a folding position; the separating blade and the folding blade being solid with one another.

5. The module as claimed in claim 1, further comprising a dispensing device configured to dispense the ticket to a user; said dispensing device being static with respect to the chassis; said robot comprising a ticket holding and transporting mechanism configured to: orient at least a portion of the cut ticket in a direction substantially parallel to said axis of stacking; and transport the ticket to the dispensing device.

6. The module as claimed in claim 5, said dispensing device comprising one or more ticket sensors configured to detect the passage of the ticket through the dispensing device.

7. The module as claimed in claim 5, characterized in that said ticket holding and transporting mechanism comprises a receptacle provided with guides which may be mobile with respect to the robot.

8. The module as claimed in claim 1, characterized in that it further comprises a barcode reader able to identify a ticket before it passes into the dispensing device, the module further comprising a communication system for transmitting data supplied by the barcode reader to a remote server.

9. The module as claimed in claim 1, said robot being capable of translational movement along said axis of stacking.

10. The module as claimed in claim 1, the cassette comprising a raiser configured to raise one side of the book of tickets when it is housed in said housing.

11. The module as claimed in claim 1, characterized in that the one or more of the plurality of cassettes comprises at least one regulating guide delimiting the width of the housing of the cassette or a second guide delimiting the length of the housing of the cassette or the combination of at least one regulating guide and of a second guide.

12. The module as claimed in claim 1, the mobile robot comprising said separation device (26) and/or said folding device.

13. The module as claimed in claim 1, said separation line being one of the precut lines of the book.

14. An apparatus for dispensing tickets, comprising:
a module as claimed in claim 1, and a power supply device for electrically powering said module.

15. The apparatus as claimed in claim 14, the apparatus comprising a base secured to the chassis of the module, the base allowing the apparatus to be sited above a bearing surface extending substantially horizontally; and/or the apparatus and/or the chassis being configured to allow the apparatus to be fixed to a retaining surface extending substantially vertically; as a preference, when the apparatus is placed on top of said bearing surface and/or fixed to said retaining surface, the axis of stacking is parallel to the direction of gravity.

16. A method for dispensing a ticket using a dispensing module or apparatus comprising a chassis configured to hold a plurality of cassettes, each cassette comprising a housing for housing a book of tickets, a robot with respect to said chassis and a separation device; the method comprising the steps of:
selectively coupling the robot with one of the cassettes of said dispensing module or apparatus;
actuating, by means of an actuator of the robot, a dispensing mechanism of the cassette so as to extract a terminal portion of the book from the coupled cassette;
receiving said terminal portion of the book on a receiving device of the robot; and
separating the ticket from the terminal portion using the separation device;
wherein the step of separating the ticket comprises:
aligning a separation line of the terminal portion of the book with the separation device, this step being performed jointly by the receiving device and the dispensing mechanism; and/or
tensioning said terminal portion of the book, this being performed jointly by the receiving device and the dispensing mechanism.

17. The method as claimed in claim 16, said step of separating the ticket comprising a step of:
folding said terminal portion of the book to correspond with said separation line.

18. The method as claimed in claim 16, said separation line being one of the precut lines of the book.

* * * * *